(12) United States Patent
Breitkreuz (10) Patent No.: US 12,255,570 B2
(45) Date of Patent: Mar. 18, 2025

(54) PORTABLE AND SCALABLE POWER GENERATING SYSTEMS AND METHODS THEREOF

(71) Applicant: Helmut Breitkreuz, Buttaba (AU)

(72) Inventor: Helmut Breitkreuz, Buttaba (AU)

( * ) Notice: Subject to any disclaimer, the term of this patent is extended or adjusted under 35 U.S.C. 154(b) by 141 days.

(21) Appl. No.: 17/638,717

(22) PCT Filed: Dec. 11, 2019

(86) PCT No.: PCT/AU2019/051363
§ 371 (c)(1),
(2) Date: Feb. 25, 2022

(87) PCT Pub. No.: WO2021/035274
PCT Pub. Date: Mar. 4, 2021

(65) Prior Publication Data
US 2022/0278636 A1 Sep. 1, 2022

(30) Foreign Application Priority Data
Aug. 26, 2019 (AU) .................... 2019100953

(51) Int. Cl.
*H02K 53/00* (2006.01)
*H02J 7/14* (2006.01)
(Continued)

(52) U.S. Cl.
CPC .............. *H02P 9/02* (2013.01); *H02J 7/1423* (2013.01); *H02J 7/143* (2020.01); *H02K 7/1807* (2013.01); *H02K 7/006* (2013.01)

(58) Field of Classification Search
CPC .......... H02P 9/02; H02K 47/14; H02K 53/00; H02K 7/1807; H02K 49/102; H02K 16/00;
(Continued)

(56) References Cited

U.S. PATENT DOCUMENTS 3,671,756 A * 6/1972 Meier .................. H02K 7/1823
290/54
5,192,899 A * 3/1993 Simpson ............... F15B 11/042
310/216.039
(Continued)

FOREIGN PATENT DOCUMENTS

AU 2012100280 A4 6/2012
FR 2907278 A3 4/2008
WO 2014011298 A2 1/2014

OTHER PUBLICATIONS

International Search Report and Written Opinion, mailed Feb. 26, 2020, for International Patent Application No. PCT/AU2019/051363. (8 pages).
(Continued)

*Primary Examiner* — Gabriel Agared
(74) *Attorney, Agent, or Firm* — Seed IP Law Group LLP (57) ABSTRACT

The present disclosure provides a portable power generating system configured to utilize self-sustained energy to provide velocity and movement to turn a central tubular axle which is encompassed by two or more magnets spread evenly around the circumference of the axle to generate motion. The motion of the revolving magnets turns the armature of one or more DC power generating motors which in turn produce electricity. The central tubular axle supported by two DC power generating motors are connected to each end of the central tubular axle. One of the DC power generating motors revolves in a clockwise direction during operation and the DC power generating motor at the opposite end of the central tubular axle is configured to operate in an anti-clockwise motion during operation.

15 Claims, 8 Drawing Sheets

(51) Int. Cl.
  *H02K 7/18* (2006.01)
  *H02K 16/00* (2006.01)
  *H02P 9/02* (2006.01)
  *H02K 7/00* (2006.01)

(58) Field of Classification Search
  CPC .. H02K 7/006; H02J 7/143; H02J 7/34; H02J 7/1423
  USPC .......................................................... 318/139
  See application file for complete search history.

(56) References Cited

U.S. PATENT DOCUMENTS

| | | | |
|---|---|---|---|
| 8,519,584 B2* | 8/2013 | Tkadlec | H02K 49/102 310/80 |
| 2005/0023916 A1 | 2/2005 | Moe | |
| 2008/0211432 A1* | 9/2008 | Shkondin | B60L 50/52 318/140 |
| 2015/0171674 A1* | 6/2015 | Lee | H02P 25/22 310/46 |
| 2015/0188400 A1* | 7/2015 | Kemp | H02K 53/00 74/DIG. 9 |
| 2016/0072373 A1* | 3/2016 | Farquharson | H02K 7/116 74/DIG. 9 |

OTHER PUBLICATIONS

Australian Examination Report, dated Nov. 27, 2023, for corresponding patent application 2019464161. (3 pages).

European Search Report, dated Nov. 2, 2023, for corresponding patent application 19943756.7. (10 pages).

* cited by examiner

PORTABLE AND SCALABLE POWER GENERATING SYSTEMS AND METHODS THEREOF

TECHNICAL FIELD

The present disclosure is related to the field of power generators. More particularly, the present disclosure relates to a portable and scalable power generating system configured to amplify energy to generate direct current power on demand.

BACKGROUND

Any references to methods, apparatus or documents of the prior art are not to be taken as constituting any evidence or admission that they formed, or form part of the common general knowledge.

Global warming has become a serious problem in today's world. Carbon dioxide emission by use of fossil fuels and radioactive waste and contamination by nuclear power plant accidents are primary reason for the global warming. Under these circumstances, power generation using renewable energy sources like sun light, wind, water, and the like have been put into practice all over the world.

Solar power generation system generates power using solar/sun light as an inexhaustible and clean energy source, the geothermal power generation system generate energy by using geothermal energy, and the wind power generation generates energy using wind power. But for generating large amount of energy using these renewable energy-based power generation systems may need a number of components to be installed, that may require a large space for installing the power generation system. For example, a number of wind mills may require acres of space for installation. Also, the infrastructure cost for these power systems may increase with an amount of power to be generated.

The solar power generation systems usually includes solar batteries and one or more inverters. The solar batteries may be installed in various forms depending on a scale of power output ranging from several watts (W) to several thousand kilowatts (kW) of power. The solar battery based solar power generation system collects a direct current power generated by an array of solar battery including multiple solar battery modules connected in series and/or in parallel. An inverter having a capacity of 3 to 5 kW may be used in such solar power generation system and usually attached to the outer wall or entrance of a house. Assume that for the large capacity of the solar battery based solar power generation system, a plurality of solar battery arrays need to be installed at different locations. Further, it may require installing multiple inverters. For example, assume that a 3 kW solar battery array is installed on the north side of a roof of a house, and another solar battery array having the same or more capacity is installed on the south side. In such a case, a plurality of inverters connected in parallel arrangement may be used.

When a number of inverters are connected in parallel even when a failure occurs in one inverter, the failure can affect the whole power generation system. Such problems are not limited to solar power generation systems and are common to power generation systems using any other direct current power sources. Most of the existing power generation systems are huge in size, hence may require a large space for installation, which is not always economical and feasible.

It is an object of the present invention to overcome or ameliorate the above discussed disadvantages of the prior art, or at least offer a useful alternative. In light of above, there exists a need and opportunity to provide a power generating system that is compact and cost-effective.

SUMMARY

To address the above-mentioned issues, the present disclosure provides a power generating system configured to use self-energy velocity and movement to turn an axle placed on a plurality of magnets comprising rare earth magnets to generate motion. The motion of the revolving magnets turns an armature of direct current power generating motors that in turn may produce DC power. The power generating system may be connected to a charger controller that may be connected to a grid or a battery storage device for supplying or storing the generated power. Further, the power generating system is compact, portable and scalable. The power generating system can be scaled depending on an output of power desired from the system.

An embodiment of the present disclosure provides a portable power generating system including at least one axle, one or more magnets located on a central part of the at least one axle such that the one or more magnets is spread evenly around a circumference of the at least one axle, at least two direct current power generating motors connected to two opposite ends of the at least one axle, and at least one battery. The at least one direct current power generating motor of the at least two direct current power generating motors is connected to the at least one battery. The at least one battery is configured to turn the at least one axle at a high revolution speed through the at least one direct current power generating motor. The at least one axle at the high revolution speed rotates the one or more magnets. The at least two direct current power generating motors may generate direct current power when the rotation of the one or more magnets turns an armature of the at least two direct current power generating motors. The at least two direct current (DC) power generating motors connected to the at least one axle are configured to form a stackable structure to produce multiples of the direct current power.

According to an aspect of the present disclosure, the at least one axle is configured to support a plurality of magnets so as to capture energy by equalizing a speed flow connected to a surface of the plurality of magnets on the at least one axle.

According to another aspect of the present disclosure, the one or more magnets and the plurality of magnets may include a rare earth magnet.

According to another aspect of the present disclosure, each of the at least two direct current power generating motors are configured to: revolve in an opposite direction with respect to each other during the operation; amplify energy from the battery to generate the direct current power on demand, wherein the battery comprising a direct current battery; generate the direct current power in a range of 350 watts (W) to 1000 watts from the rotation of the one or more one magnet; and act as a set of bearings to support the at least one axle and reduce friction of the rotation of the one or more magnet.

According to another aspect of the present disclosure, the power generating system also includes a modular frame to support the at least two direct current power generating motors.

According to another aspect of the present disclosure, the power generating system is compact, portable, and scalable to any size based on a DC power output requirement.

Another embodiment of the present disclosure provides a power generating system including a direct current battery and a modular frame. The modular frame includes one or more axles, at least one magnet, and at least two direct current power generating motors. Each of the one or more axles includes two opposite ends. At least one axle of the one or more axles is connected to the direct current battery. The at least one magnet may be located on a central part of each axle of the one or more axles such that the at least one magnet is spread evenly around a circumference of the axle. Energy from the direct current battery drives the at least one axle that in turn rotates the at least one magnet. The at least two direct current power generating motors are configured to generate direct current power when the rotation of the at least one magnet turns an armature of the at least two direct current power generating motors. Each of the two opposite ends of each of the one or more axles is connected to at least one of the at least two direct current power generating motors. Further, the direct current battery is configured to turn the at least one axle at a high revolution speed through the at least one direct current power generating motor. The modular frame is compact and stackable. The at least two direct current power generating motors are configured to amplify the amount of generated direct current power to multiply the DC power.

According to another aspect of the present disclosure, the one or more axles is configured to support a plurality of magnets so as to capture energy by equalizing a speed flow connected to a surface of the plurality of magnets on the one or more axles.

According to an aspect of the present disclosure, the at least two direct current power generating motors are configured to: revolve in an opposite direction with respect to each other; and amplify energy from the direct current battery to generate direct current power on demand.

Another embodiment of the present disclosure provides a power generating system configured to generate power. The system includes at least one direct current battery. The system also includes at least one axle comprising a first end and a second end, wherein the at least one axle is connected to and driven by the at least one direct current battery, and at least one magnet connected to a central part of the at least one axle such that the at least one magnet is spread evenly around a circumference of the at least one axle. The system also includes at least two direct current power generating motors including a first direct current power generating motor connected to the first end of the at least one axle and a second direct current power generating motor connected to the second end of the at least one axle. The first direct current power generating motor is configured to revolve in a clockwise direction during operation and the second direct current power generating motor is configured to operate in an anti-clockwise motion during the operation. The at least two direct current power generating motors are configured to generate direct current power when the at least one magnet rotates based on a rotation of the at least one axle. Further, the at least two direct current power generating motors are configured to amplify the generated direct current power. The power generating system is compact and stackable.

According to another aspect of the present disclosure, the at least two direct current power generating motors are configured to amplify energy from the direct current battery to generate direct current power on demand.

According to another aspect of the present disclosure, each of the at least two direct current power generating motors are configured to generate direct current power in a range of 350 watts to 1000 watts from the rotation of the at least one magnet, wherein each of the at least two direct current power generating motors are configured to act as a set of bearings to support the at least one axle and reduce friction of the rotation of the at least one magnet.

In some embodiments of the present disclosure, the at least one axle of the power generating system may be configured to support a number of magnets so as to capture energy by equalizing a speed flow connected to a surface of the plurality of magnets on the at least one axle.

According to another aspect of the present disclosure, the power generating system may also include a modular frame to support the at least two direct current power generating motors. In a non-limiting example, the modular frame is made of aluminium. But the modular frame may be made using any suitable material comprising metals, wood, etc.

Another embodiment of the present disclosure provides a portable and scalable power generating system including a modular frame system comprising at least four direct current power generating motors connected to one or more ends of one or more axles. Each of the one or more axles may include at least one magnet attached on top of each other in the modular frame system. At least one direct current power generating motor of the at least four direct current power generating motors is connected to at least one battery. The at least one battery is configured to turn the one or more axles at a high revolution speed through the at least one direct current power generating motor. The one or more axles when moving at the high revolution speed are configured to drive at least three of the at least four direct current power generating motors to create an amplification of energy from the battery to generate direct current power. Further, the modular frame is configured to form a stackable structure to produce multiples of the generated direct current power.

Another embodiment of the present disclosure provides a method for generating power. The method includes connecting at least one axle to at least one battery, wherein the at least one axle comprises two ends and a tubular central part. The method also includes connecting at least one magnet to the tubular central part of the at least one axle such that the at least one magnet is spread evenly around a circumference of the at least one axle. The method further includes connecting at least two direct current power generating motors to the two ends of the at least one axle respectively. The method also includes supplying energy from the battery to turn at least one direct current power generating motor of the at least two direct current power generating motors, wherein the at least one direct current power generating motor rotates the at least one axle that in turn rotates the at least one magnet. The at least two direct current power generating motors are configured to generate direct current power based on the rotation of the at least one magnet.

DETAILED DESCRIPTION

Preferred features, embodiments and variations of the invention may be discerned from the following detailed description which provides sufficient information for those skilled in the art to perform the invention. The detailed description is not to be regarded as limiting the scope of the preceding summary of the invention in any way.

Specific embodiments of the present invention are described, by way of example only, with reference to the accompanying drawings, in which.

Throughout the description, the terms "portable power generating system", "power generating system", and "system" may be used interchangeably without change in its meaning.

The present disclosure provides a portable power generating system that utilizes self-sustained energy to provide velocity and movement to turn a central tubular axle which is encompassed by two or more magnets spread evenly around the circumference of the axle to generate motion. The motion of the revolving magnets turns the armature of one or more DC power generating motors which in turn produce electricity/power. The central tubular axle supported by two DC power generating motors are connected to each end of the central tubular axle. One of the DC power generating motors revolves in a clockwise direction during operation and the DC power generating motor at the opposite end of the central tubular axle is configured to operate in an anti-clockwise motion during operation.

Figure 1A:
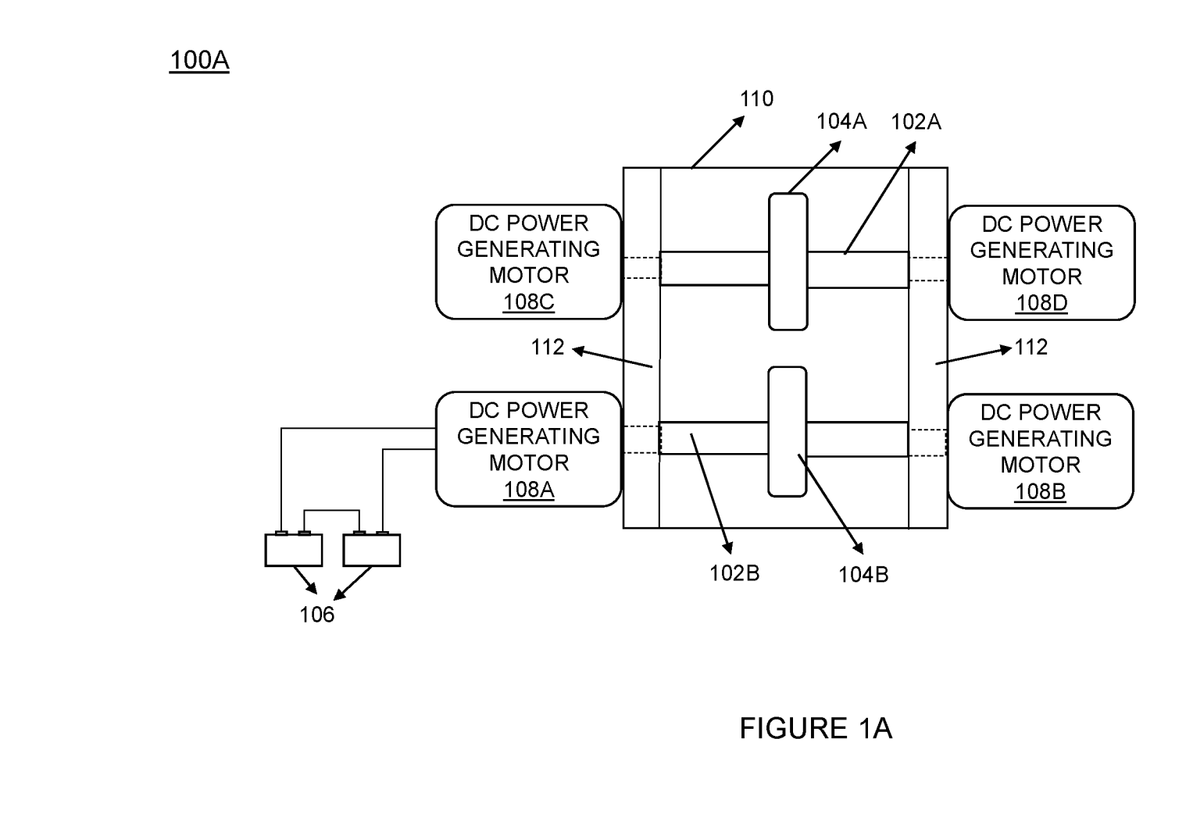
FIGS. 1A-1C illustrates exemplary power generating systems, in accordance with various embodiments of the present disclosure.
Figure 1B:
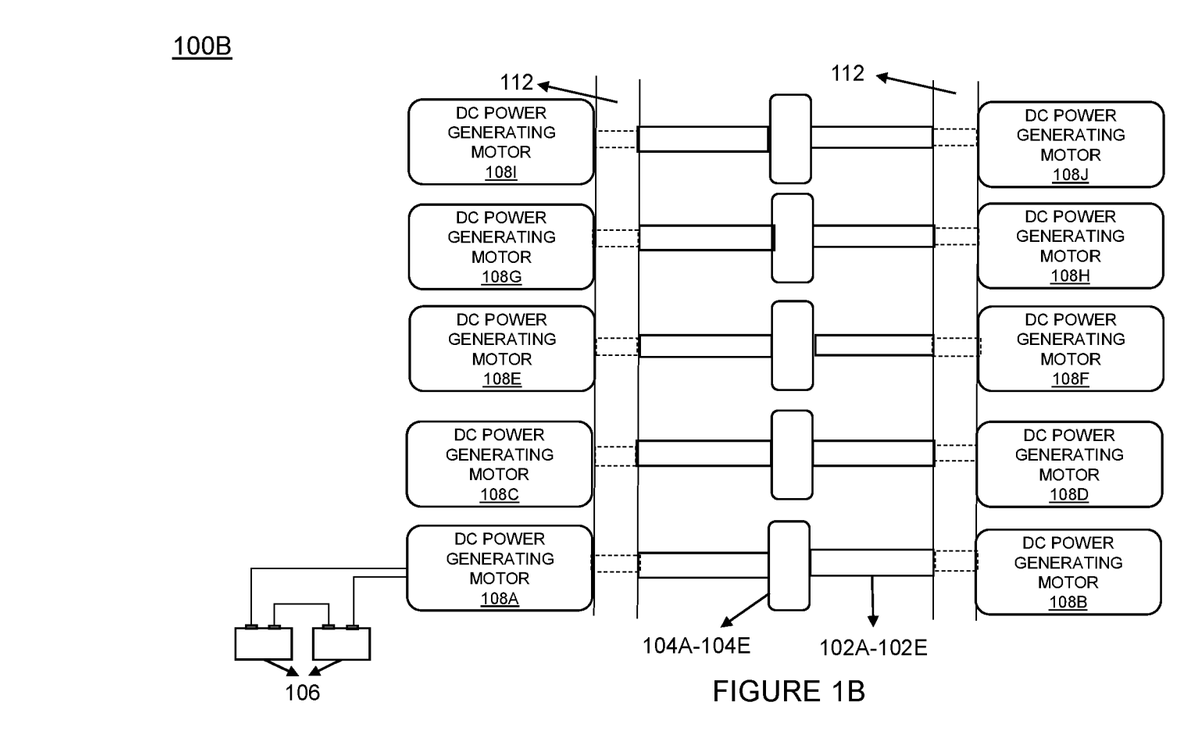
Figure 1C:
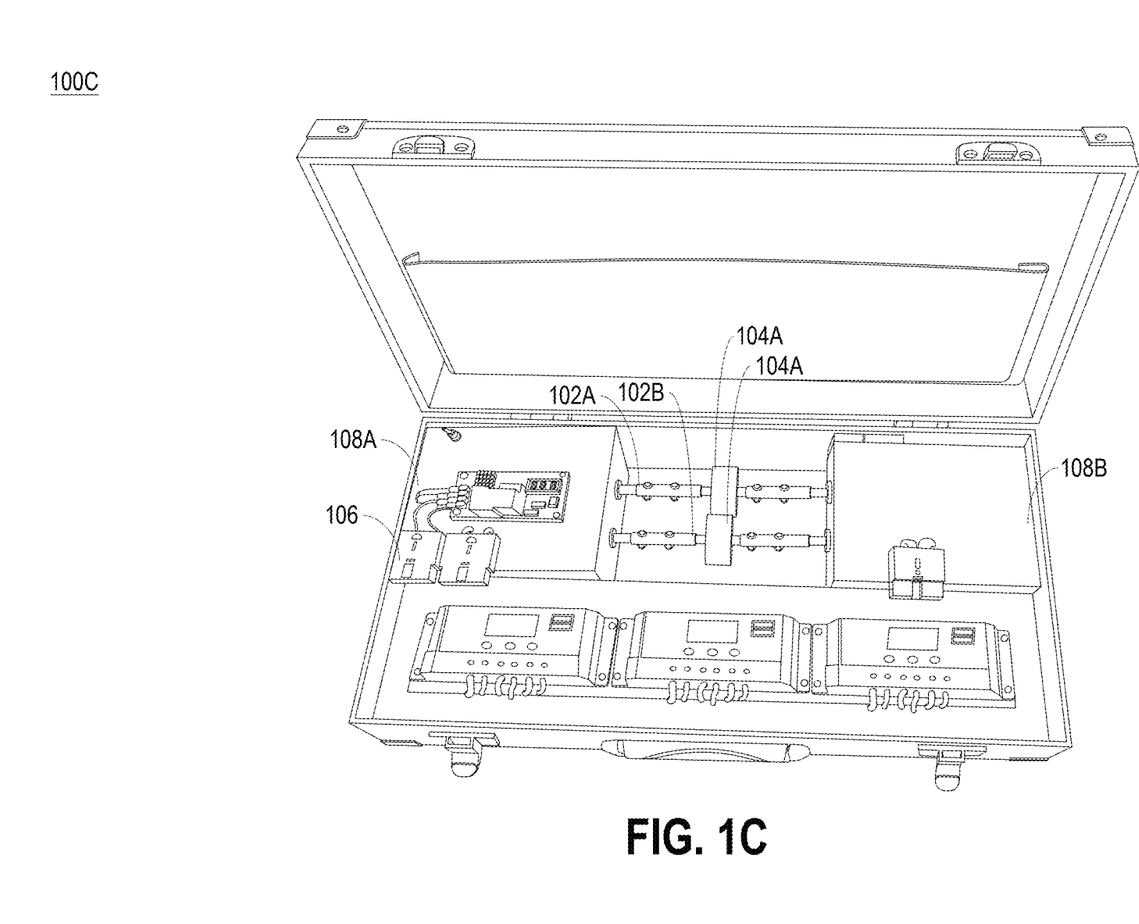

Referring to the FIGS. 1A-1C exemplary power generating systems 100A-100C100C are illustrated according to different embodiments of the present disclosure. As shown in the FIG. 1A, the power generating system 100A includes one or more axles, here two axles 102A-102B are shown, but a person skilled in the art will understand the power generating system 100A is scalable and may include more than two axles 102A-102B. Each of the axles 102A-102B includes two ends. The axles 102A-102B may be central tubular axles.

Further, the power generating system 100A includes one or more magnets for example, magnets 104A-104B. The magnet 104A may be located on a central part of the axle 102A and the magnet 104B is located on a central part of the axle 102B. The magnets 104A-104B may include a hole to receive the axles 102A-102B respectively. In some embodiments, a shape of the central part of the axle 102A-102B is substantially tubular, hence hereinafter the axles may be referred as a tubular axles 102A-102B or central tubular axles 102A-102B without change in its meaning. Further, the magnet 104A is spread evenly around a circumference of the axle 102A, and the magnet 104B is spread evenly around a circumference of the axle 102B.

Further, the portable power generating system 100A includes at least two direct current power generating motors connected to two opposite ends of the at least one axle of the axles 102A-102B. Each of the axles 102A-102B is supported by two direct current power generating motors with one direct current power generating motor at each end of the axles 102A-102B. One (such as the 108A) of the two direct current power generating motors is configured to revolve in a clockwise direction during operation and the opposing end has a direct current power generating motor (such as 108B) configured to revolve or operate in an anti-clockwise motion during the operation. As shown, the axle 102A includes a direct current (DC) power generating motor 108A at one end (or first end of the axle 102A) and a DC power generating motor 108B at another end (or a second end of the axle 102A). Similarly, the axle 108B includes a direct current (DC) power generating motor 108C at one end (or first end of the axle 102B) and a DC power generating motor 108D at another end (or a second end of the axle 102B). Though only four DC generating motors 108A-108D are shown in the FIG. 1A, but the power generating system 100A may include more than or less than four DC generating motors 108A-108D depending on the number of axles. For example, when there is one axle then the power generating system 100A may include two DC power generating motors 108A-108B. The DC power generating motors 108A-108D may act as a set of bearings to support the axles 102A-102B and reduce friction of the rotation of the magnets 104A-104B.

At least one of the DC power generating motors 108A-108D may be connected to at least one battery 106. For example, the DC power generating motor 108A may be connected to the at least one battery 106. In such embodiments, the energy from the at least one battery 106 drives the DC power generating motor 108A.

In some embodiments, the power generating system 100A includes a modular frame 110 to support the at least two direct current power generating motors 108A-108D. The power generating system 100A is a stackable and scalable system configured to amplify energy from the at least one battery 106 to generate direct current power on demand. The modular frame 110 may be made up of suitable material such as, but not limited to, aluminium, steel, etc.

As shown in the FIG. 1B, when the power generating system 100B includes five axles 102A-102E, then the power generating system 100B may include ten DC power generating motors 108A-108J. The power generating system 100B also include at least one magnet located on a central part of each of the axles 102A-102E. As shown, the axle 102A includes the magnet 104A, the axle 1028 includes the magnet 1048, the axle 102C includes a magnet 104C, the axle 102D includes a magnet 104D, and the axle 102E includes a magnet 104E. The power generating system 100A may include one or more channels 112 to support the axles 102A-102E. The one or more channels 112 may be made up of suitable material such as, but not limited to, aluminium, steel, etc.

In some embodiments, the magnets 104A-104E may include rare earth or real earth magnets. In some embodiments, the magnets 104A-104E includes an N52 rare earth magnet having N52 strength of the rare earth magnets grating. Another example of the magnets 104A-104E may include Neodymium Rare Earth Magnet. The magnets 104A-104E may allow for a powerful magnetic field, great strength and coercivity. Further, the magnets 104A-104E may include a coating of a suitable material such as, but not limited to, Zinc, chromium, stainless steel, gold, nickel, and tin, and epoxy-resin coating. The coating provide corrosion protection to the magnets 104A-104E. Further, in some embodiments, a top surface of the magnets 104A-104E may include four layers of the coating. The magnets 104A-104E are very brittle and hard, and may have least corrosion resistance of all commercial magnets, high resistance to magnetic demagnetization, excellent cost to performance ratio, and good temperature stability.

Further, the power generating systems 100A-100C100C are systems that use self-generating energy velocity and movement to run an axle such as, the axle 102A placed on the magnet 104A to generate motion. The magnet 104A may include a hole to receive the axle 102A. Similarly, the magnets 104B-104E includes a hole to receive the axles 1026-102E, respectively. The motion or the perpetual motion of the revolving/rotating magnet 104A or other magnets 1046, 104C, 104D, and/or 104E turns an armature of each of the DC power generating motors 108A-108D or 108A-108J, respectively. Hereinafter and throughout the disclosure, the DC power generating motors 108A-108E may be referred as motors 108 or DC power generating motors 108 or power generating motors 108 or DC electricity generating motor 108 without change in its meaning.

Further, the power generating systems 1006 may include the at least one battery 106. In some embodiments, the DC power generating motor 108A may be connected to the at least one battery 106. In such embodiments, the energy from the at least one battery 106 drives the DC power generating motor 108A. In alternative embodiments, the at least one battery 106 may be connected to axle such as the axle 102A. In such embodiments, the energy from the at least one battery 106 drives the axle 102A. The at least one battery 106 may be a direct current motor. Examples of the at least one battery 106 may include a 12 volts (V) battery, a 24 volts battery, a 36 volts battery, a 48 volts battery, and up to 140 volts battery. In some embodiments, the at least one battery 106 may be a solar based battery or any other renewable source of energy-based battery.

The power generating system 100A, 1006, and 100C are portable, compact and scalable. The number of magnets and the DC power generating motors may be scaled or may differ based on the number of axles in the power generating systems 100A-100C and/or depending on a power output desired from the systems 100A-100C. Further, the power generating systems 100A-100C are compact, portable, scalable, and stackable system. Further, the power generating systems 100A-100C are configured to multiply the amount of DC power for applications requiring larger amounts of power supply with excess power generated being available for battery storage or may be transferred to a grid (or power grid).

Further, the power generating system 100A and 1008 are configured to use self-generating energy velocity and movement to turn an axle such as the axle 102A placed on rare earth magnets 104A and/or 1048 to generate motion. The motion of the revolving magnets 104A-104B turns an armature of the DC power generating motors 108B-108J, which in turn generated DC power. Hence, the power generating system 100A and 100B are configured to operate by initially taking a small amount of energy from the battery 106 and then using the self-generated DC power for operation.

The motors 108 may produce the speed or rotation per minute (RPM) to increase the power supply by the at least one battery 106 such as from 12V to 24V to 36V and up to 140V, by this motors 108 may balance the RPM. The motors 108 may be stacked to a higher level to balance the generated DC power output of the DC power generating motors 108. Each of the DC power generating motors 108A-108J may has a capacity of producing DC power from 350 watts to 1000 watts from the rotation of the magnets 104A-104E. Further, the motors 108A-108J may also act as a set of bearings to support the axles 102A-102E and to reduce friction of the rotation of the magnets 104A-104E.

In some embodiments, the magnets 104A-104E may include a hole such as a 12.8 mm square hole. The magnets 104A-104E may include the coating of strong material to avoid wear and tear. In an example, a length of the magnets 104A-104E is 60 MM and width of the magnets 104A-104E is 20 MM. The magnets 104A-104E may be of any size, and shape depending on a size and shape of the ales 102A-102E.

Further, each axle of the axles 102A-102E may support a plurality (or multiplicity) of magnets 104A-104E to capture the energy by equalizing the speed flow connected to the surface of the magnets 104A-104E on the respective axles 102A-102E, driven by one single motor i.e. 108A energized by the at least one battery 106 like a 12V battery.

In some embodiments, the at least one battery 106 is configured to turn the at least one axle, such as the axle 102A, at a high revolution speed through at least one direct current power generating motor such as the motor108A. The axle 102A when at the high revolution speed may rotate at least one magnet of the magnets 104A-104E. The direct current power generating motors 108A-108J may generate direct current power or electricity when the rotation of the one or more magnets 104A-104E turns an armature of the direct current power generating motors 108A-108J. In some embodiments, the direct current power generating motors 108A-108J connected to the at least one axle are configured to form a stackable structure to produce multiples of the direct current power.

In some embodiments, the power generating system 1008 may be included in an amplification structure with motors 108A-108N attached in a frame such as the frame 110 driven by a motor such as the motor 108A (may also be referred as a motor driver 108A) that is powered by the at least one battery 106 to turn multiple DC power generating motors 108B-108E connected with the axles 102A-102E from one site to the other site. The magnetic force of one magnet of the magnets 104A-104E may turn like perpetual motion to other magnets of the magnets 104A-104E to generate DC power from each motors 108A-108J. The power generating system 1008 or the amplification structure is scalable to any size for the required DC power outputs.

In some embodiments, the power generating system 100A-100C are energy generating devices configured to amplify energy from a battery, such as a renewable energy source-based battery, to generate direct current power on demand. In some embodiments, some part of the generated DC power may be used to charge the at least one battery 106. Further, the power generating system 100A and 100B are designed to be used in or with any device, system that need power to operate. Further, the power generating system 100A and 1008 may supply energy to power grids, from where the power may be supplied to one or more places or devices requiring power i.e. electricity.

FIG. 1C illustrates the power generating system 100C which is compact, portable, and easy to carry around, in accordance with an embodiment of the present disclosure. As shown, the power generating system 100C may be designed as compact as a briefcase and can be used to generate power on demand. The briefcase like design of the power generating system 100C may make it easy to carry anywhere where power may be required. For example, a user can carry the power generating system 100C in form of the briefcase anywhere like while camping and can use it to supply power to lights, toaster etc. during camping.

In some embodiments, the DC power generated by the power generating system 100A, 1008, and 100C may be converted to AC power before supplying to the grid etc. In some embodiments, the power generating systems 100A-100C may include a DC to AC power convertor/adapter configured to convert the DC power to AC power.

Further, the power generating systems 100A-100C may be used for supplying power to military camps, power operated devices used in military, weapons, tanks, ships, airplanes, jet aircrafts, and supporting tools such as communications systems that require power.

Figure 2:
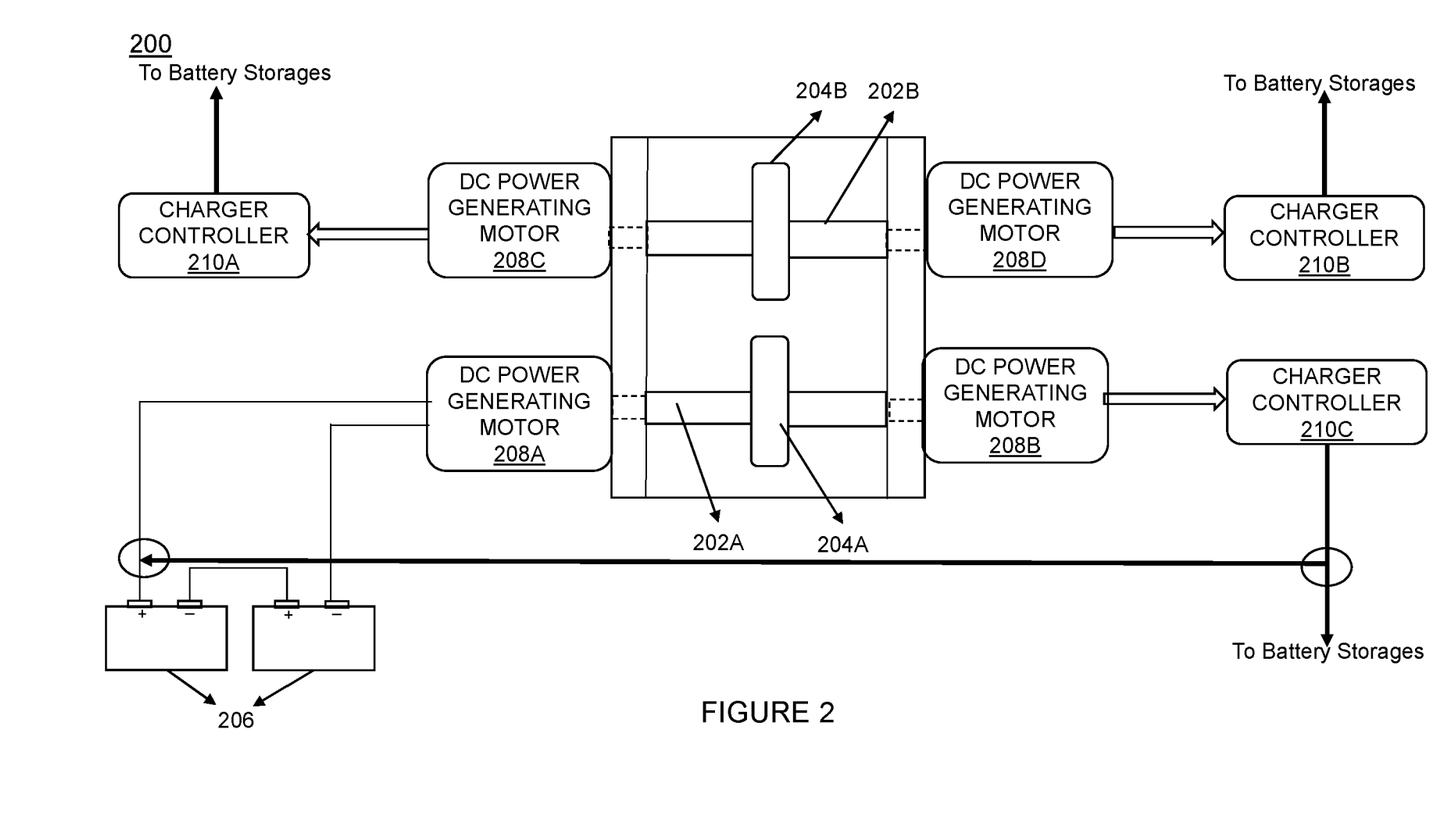
FIG. 2 illustrates an amplifying system with a plurality of DC power generating motors, in accordance with different embodiments of the present disclosure.

Referring now to the FIG. 2, an amplifying system 200 with a plurality of DC power generating motors 208A-208D is illustrated. Hereinafter, the terms "DC power generating motors" and "motors" may be used interchangeably without change in its meaning. The amplifying system 200 includes a power generating system including the motors 208A-208D driven by one motor such as the motor 208A of the motors 208A-208D. The power generating system also includes one or more axles 202A-202B having one or more magnets 204A-204B. The amplifying system 200 also includes at least one battery 206 connected to the motor 208A of the power generating system, and one or more charger controllers 210A-210C connected to the motors 208B-208D. Each of the motors 208A-208D may include a current carrying armature which is connected to a supply end like charger controllers 210A-210C for example, through a commutator segment and brushes. The armature is placed between two permanent magnets which produce a magnetic field. The at least one battery 206 may be a direct current battery of any capacity ranging from 12V to 140V. The charger controllers 210A-210C may be of any size or capacity ranging from 12V to 72V or more. Further, the at least one battery 206 may be a renewable energy-based battery such as, but not limited to, a solar battery.

One of the motors 208A-208D i.e. the motor 208A (hereinafter the motor 208A may also be referred as a driver motor 208A) is connected to the at least one battery 206 and may be powered by the at least one battery 206. The at least one battery 206 may drive the motor 208A that in turn may move the axle 202A and/or the motor 208B. The perpetual motion of the magnet 204A may move the magnet 204B, this may in turn move the axle 202B and the motors 208C-208D. This way, the motor 208A may turn the other motors 208B-208D connected with the axles 202A-202B, that are turned by magnetic force of the magnets 204A-204B like perpetual motion of the magnets 204A-204B. The movement of the motors 208B-208D may generate DC power from each of the motors 208B-208D based on the rotation of the magnets 204A-204B. In some embodiments, the DC power generating motors 208A-208D comprises Wind DC power generating motors, solar DC power generating motors, or any other renewable energy-based DC power generating motor. Further, the DC power generating motors of any the size, shape and capacity may be used in the power generating system or the amplifying system 200 for generating power. Further, the number of DC power generating motors in the amplifying structure 200 may vary, i.e. there may be less than or more than four DC power generating motors 208A-208D.

The DC power generating motors 208B-208D may transfer the generated DC power to connected charger controllers 210A-210C, respectively. Further, the charger controllers 210A-210C may be connected to battery storages for storing the generated DC power. In some embodiments, 80 percent of the generated DC power is stored in the battery storages and 20 percent of the generated DC power may be redirected to recharge driver motor's battery i.e. the at least one battery 206. The charger controllers 210A-210C may limit a rate at which DC power i.e. electric current is added to or drawn from the battery storages. Further, the charger controllers 210A-210C may prevent overcharging and may protect against overvoltage. Each of the at least two direct current power generating motors of the motors 208A-208D connected to opposite ends of the axles 202A-202B are configured to revolve in an opposite direction with respect to each other during the operation. For example, the motor 208C may revolve in clockwise direction and the motor 208D may revolve in an anti-clockwise direction to operate.

Further, the motors such as the motors 208B-208D are configured to amplify energy from the at least one battery 206 to generate the direct current power on demand. Each of the motors 208B-208D is configured to generate the direct current power in a range of 350 watts to 1000 watts from the rotation of the one or more one magnets 204A-204B. Further, each of the motors 208B-208D may act as a set of bearings to support the axles 202A-202B, and reduce friction of the rotation of the one or more magnets 204A-204B.

In some embodiments, some part of the generated DC power may be used to charge the at least one battery 206. For example, 20% of the storage power may be rediverted to recharge the at least one battery 206 that drives the motor 208A. The motors 208A-208D may run continuously 24 hours a day. The charger controller 210C may redivert the DC power to the at least one battery 206 for charging the at least one battery 206.

Figure 3A:
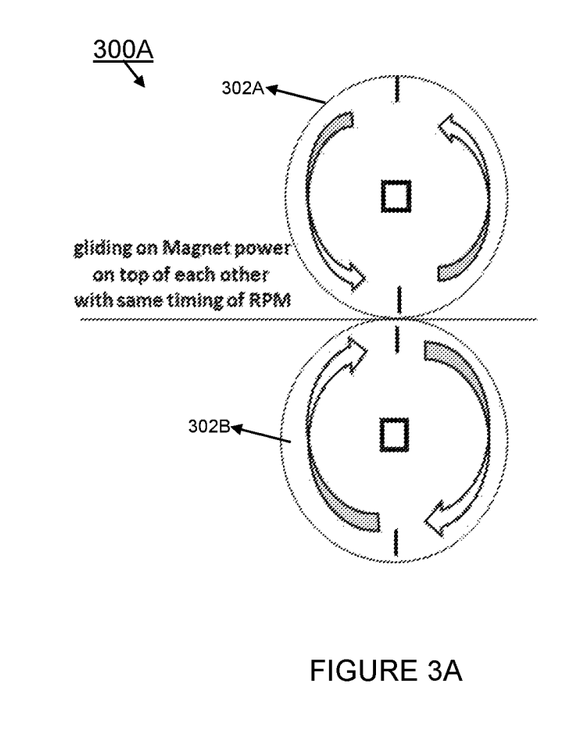
FIGS. 3A-3B illustrates schematic view of one or more magnets attached on one or more axles of a power generating system, in accordance with an embodiment of the present disclosure.
Figure 3B:
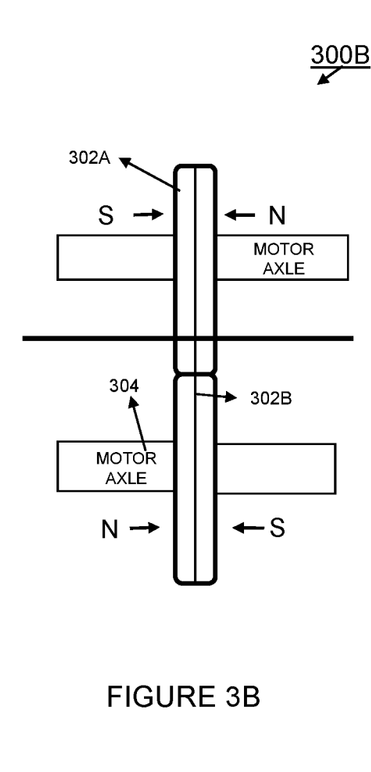

FIGS. 3A-3B illustrates schematic views 300A-300B of one or more magnets 302A-302B on one or more axles 304A-304B of a power generating system, in accordance with an embodiment of the present disclosure. In some embodiments, each of the magnets 302A-302B may be 60 MM high and 20 MM thick. Further, the magnets 302A-302B of any height and thickness may be used in the power generating system. In some embodiments, the magnets 302A-302B may include N52 real/rare earth magnets with a centre square hole to fit the axles 304A-304B, respectively. In some embodiments, the axles 304A-304B includes aluminium axles. The magnets 302A-302B are installed on the axles 304A-304N in such a manner that the magnets 302A-302B may glide on top of each other with same timing of RPM as shown in the FIG. 3A. The perpetual motion of the magnets 302A-302B may turn DC power generating motors of the power generating system. The movement of the DC power generating motors may generate DC power.

In some embodiments, each of the axles 304A-304B may support a plurality of magnets (like 302A) so as to capture energy by equalizing a speed flow connected to a surface of the plurality of magnets on the axles 304A-304B.

Figure 4:
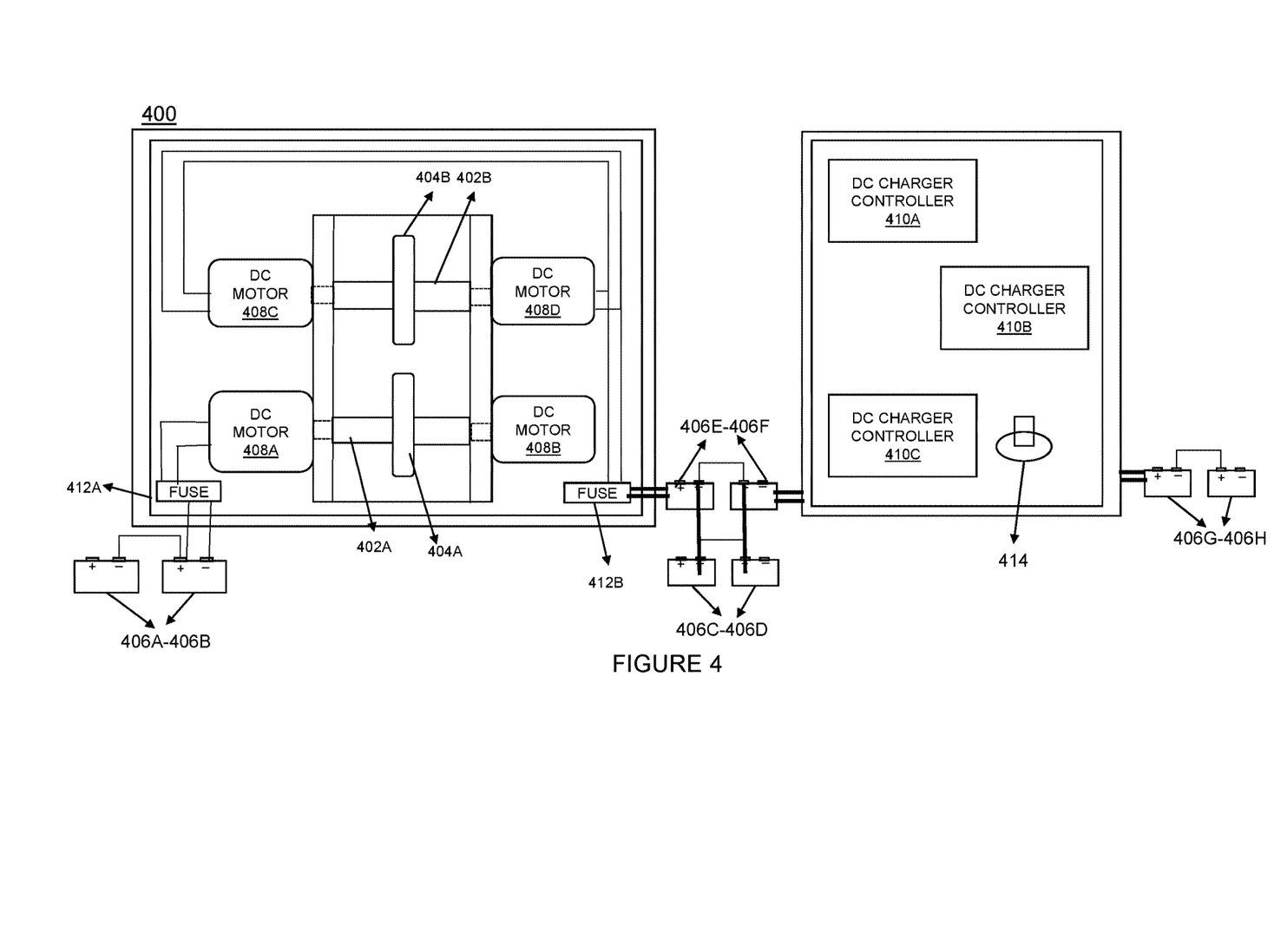
FIG. 4 illustrates an exemplary power generating system in accordance with an embodiment of the present disclosure.

FIG. 4 illustrates an exemplary power generating system 400, in accordance with an embodiment of the present disclosure. The power generating system 400 (hereinafter may be referred as a system 400) is a renewable energy device or system configured to amplify energy to generate direct current (DC) power on demand. The system 400 is running from DC power and can produce DC power from 1 KW per hour to MW per hour. The system 400 includes four DC power generating motors 408A-408D, two axles 402A-402B, and two magnets 404A-404B. At least one motor like motor 408A of the motors 408A-408D may be driven by two batteries 406A-406B to drive other three motors 208B-208D to produce the output of DC power up to a require watts. Each motor of the motors 408B-408D may be connected to a charger controller. For example, the motors 408A-408D may be connected to DC charger controllers 410A-410C. In some embodiments, the motor 408A may be connected to the batteries 406A-406B via a fuse 412A. In some embodiments, the motors 408A-408D (or the motors 408B-408D) are connected to batteries 406C-406F via a fuse 412B. The batteries 406C-406F may be connected to the DC charger controllers 410A-410C. The batteries 406A-406B may supply a power of 24V to the motor 408A. The batteries 406G-406H may be connected to the DC charger controllers 410A-410C for storing the excess power. The DC charger controllers 410A-410C may have a capacity of 24V. In some embodiments, the DC charger controllers 410A-410C may have a capacity in a range of 12V to 72V. The capacity of the DC charger controllers 410A-410C may be selected based on an output of DC power desired from the system 400.

In some embodiments, each of the three motors 408B-408D may connect to its DC power to the DC charger controllers 410A-410C having an operation specification of 24V and 30 A (ampere) of output in KWH (kilowatt per hour) like 750 KWh. The DC output power is only what the charger controllers 410A-410C is built for. In some embodiments, each of the DC charger controllers 410A-410C may only produce an output of the three motors that is equal to three times of 24V i.e. 72V. This may produce 2.2 KW in an hour and 52.8 KW in 24 hours.

Further, the power generating system 400 may be manufactured to any sizes for example, right up to multi 1 MW power station of which it can be connected to any inverter and/or battery charger to store DC power for converting it the AC power and grid power. The power generating system 400 is designed and shaped for space saving and cost efficiency for installation and maintenance services. The power generating system 400 is compact and hence saves space for installation, which in turn saves installation costs.

In some embodiments, the flow of power/DC power from the DC controllers 410A-410C to the battery 406G-406H or from the battery 406C-406F to the DC controllers 410A-410C may be controlled using an ON/OFF switch 414.

Figure 5:
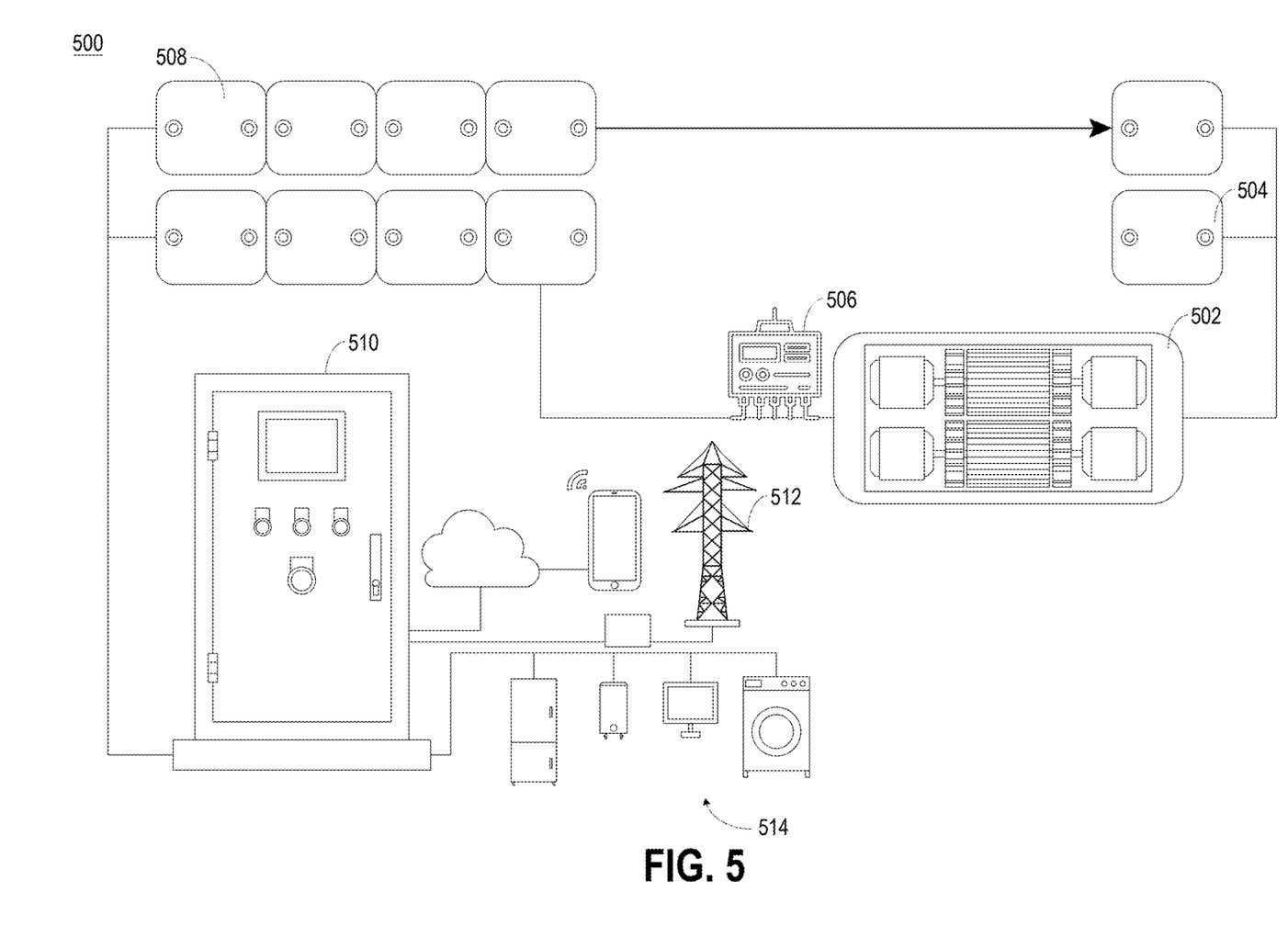
FIG. 5 illustrates an exemplary scenario where various embodiments of the power generating system can be implemented.

FIG. 5 illustrates an exemplary scenario 500 where various embodiments of the power generating system can be implemented. The scenario 500 depicts a power generating system 502 connected to at least one battery 504 and at least one charger controller 506. In an exemplary scenario, there may be two batteries 504 of 12 V. The power generating system 502 includes one or more DC power generating motors. One of the motors may be connected to the at least one battery 504. Rest of the motors may be connected to the at least one charger controller 506. The at least one battery 504 may be a direct current battery of any capacity ranging from 12V to 140V. In some embodiments, the direct current battery may be of any capacity less than 12V or more than 140V. In some embodiments, the at least one charger controller 506 may be of any size or capacity ranging from 12V to 72V or more.

The power generating system 502 also includes one or more axles with one or more magnets. The at least one battery 504 drives the motor that in turn drives one of the one or more axles. When the axle moves, the magnet of the axle rotates, and turns the other motors. The perpetual motion of the magnets turns the motors, then the motors generated DC power. The generated DC power is stored in battery storage 508 through the at least one charger controller 506.

The battery storage 508 may be connected to an inverter or an DC to AC convertor system 510. The system 510 may convert the generated DC power into 220 or 110V power. The system 510 may supply the power (or the AC power) to a grid 512 or to domestic system 514 including one or more appliances like refrigerator, washing machine, television, etc.

Figure 6A:
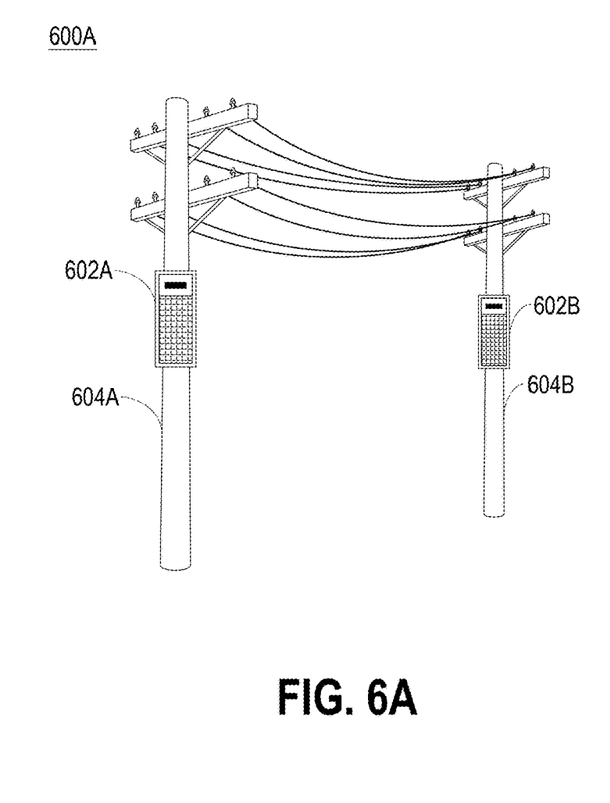
FIGS. 6A-6B illustrates exemplary scenarios where various embodiments of the power generating system can be implemented.
Figure 6B:
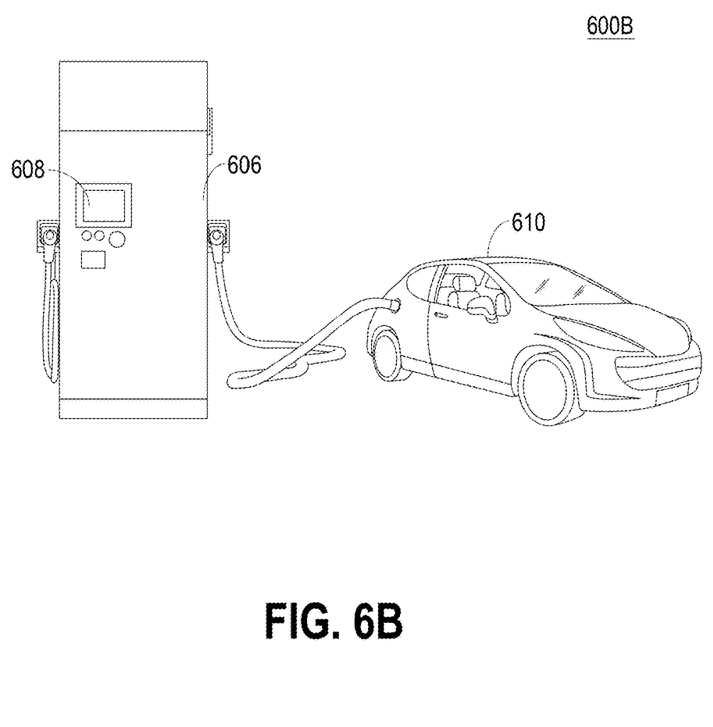

FIGS. 6A-6B illustrates exemplary scenarios 600A-600B where various embodiments of the power generating systems 602A-602B can be implemented. In some embodiments, the power generating systems 602A-602B are compact, portable, hence may be installed directly on power grids 604A-604B, respectively as shown in the exemplary scenario 600A.

In alternative embodiments, a power generating system 606 may be installed in an electric vehicle (EV) charging station 608 for charging one or more vehicles 610. The vehicles may include all kinds of vehicles such as, but not limited to, cars, trucks, buses, scooters, taxies, etc.

In some embodiments, the power generating system 606 may be installed within the vehicles and/or all types of the electric vehicles. In such embodiments, the power generating system 606 may act as a primary power source for the vehicles/electric vehicles, which may significantly reduce the need for battery in the vehicles/electric vehicles, and may not require power from any external power source. Further, as the power generating system 606 is included within the vehicles/electric vehicles, then the EV Charging Station 608 may not be required to charge the vehicles/electric vehicles.

Further, the power generating system of the present disclosure has a myriad of industry applications such as, but not limited to, Data Centres, EV Charging Stations, Emergency Medical Equipment, Mining Villages, Telecommunication Towers, Residential and Commercial Strata, offices, electric vehicles, vehicles, and for supplying power to military camps and military devices.

In some embodiments, the disclosed power generating system may be used or embedded in a robot or robotic machines for providing power to the same.

Further, the disclosed power generating system may be installed within or used with such as, but not limited to, all types of transportation or electric vehicle transportation, trucks, boats, utility vehicles, trains, drones, airplanes, ships, jet aircrafts, buses, scooters, and taxis. Further, the power generating system of the present disclosure can be used to supply power to any electric device, system or vehicle that require power/electricity for operating. The size of the power generating system can be scaled depending on a power required for operating the electric device, system or vehicle.

Further, the power generating system of the present disclosure is configured to be compact, portable and scalable. Hence, the power generating system can be scaled to any size depending on a power or electricity output requirement. Further, the power generating system can be directly or indirectly connected to the devices requiring the power to run or operate. In some embodiments, the power generating system can be embedded in the electronic devices, electronic systems, grids, or vehicles like electric vehicles.

According to an embodiment of the present disclosure, a power generating system includes four DC power generating motors connected by an axle with magnets attached on top of each other in a modular frame system. The magnets may be permanent magnets, such as, but not limited to, rare earth magnets. One DC power generating motor may be connected to at least one 12V or a 48V battery, which turns the axle at a high revolution speed which in turn drives the three DC power generating motors to create an amplification of DC power. Such power generating system is very efficient as it produces 72 KW in 24 hours of operation from the three generating motors with are distribution of 20% of the DC Power generated back to the battery which activated the first DC power generating motor. The DC power generating motor connected to the battery may also be referred as a DC motor driver.

In some embodiments, a power generating system includes two Wind DC power generating motors on each end of an axle with magnet or any other substance attached to turn the Wind DC power generating motors to produce energy of DC power. The power generating system is stackable to any size to increase the output of energy.

The disclosed portable and scalable power generating systems runs a DC power generating motor that drives power from a battery or battery system including a 12V battery to 140V battery. The battery may be a DC battery or any renewable source-based battery. This DC power generating motor may turn all other DC power generating motors stacked to charge DC power direct into a battery storage, of 100 percent capacity of each of the DC power generating motors.

In some embodiments, the power generating system can be manufactured to any sizes right up to multi megawatt power station. The This DC power generating motor can be connected to a suitable inverter and battery charger (i.e. charger controller) to store and convert DC power to AC power/grid power.

The disclosed power generating systems has applications to be used in a singular form or in a multiplicity of systems to form a stackable structure capable of producing multiples of power output from 1 KW units to multiplied 1 MW power stations, with minimum costing for maintenance & installation.

The disclosed power generating systems are shaped and designed for space saving and cost efficiency for installations and maintenance services.

The disclosed power generating system includes multiple DC power/electricity generating motors on each end of one or more axles driven by magnets stack to any size only driven by one of the DC power/electricity generating motors. The magnets RPMs turns at a same speed as the driving motor produce. The power generating system is a compact, portable and stackable system configured to multiply the amounts of power or electricity available from a compact space.

In some embodiments, the power generating system includes a modular frame supports the at least two direct current power generating motors. Further, the modular frame may include a cartridges frame system for stackable DC generating frame system. The modular frame or the cartridges frame system is scalable to any sizes required for installation and inspection and maintenance services. The power generating system may be scaled or designed for supplying for a 44 KW per hour energy storage system. The power generating system may operate 24 hours to supply 1 megawatt (MW) DC power on demand.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

What is claimed is:

1. A portable power generating system comprising:
   at least one axle;
   one or more magnets located on a central part of the at least one axle such that the one or more magnets is spread evenly around a circumference of the at least one axle;
   at least two direct current power generating motors, each connected to opposite ends of the at least one axle such that the motors face one another and rotate in the same direction as the at least one axle but in opposite directions relative to each other due to their facing orientation when the at least one axle is turned; and
   at least one battery;
   wherein at least one direct current power generating motor of the at least two direct current power generating motors is connected to the at least one battery;
   wherein the at least one battery is configured to turn the at least one axle at a high revolution speed through the at least one direct current power generating motor;
   wherein the at least one axle at the high revolution speed rotates the one or more magnets;
   wherein the at least two direct current power generating motors generates direct current power when the rotation of the one or more magnets turns an armature of the at least two direct current power generating motors; and
   wherein the at least two direct current power generating motors connected to the at least one axle are configured to form a stackable structure.

2. The portable power generating system of claim 1, wherein the at least one axle is configured to support a plurality of magnets so as to capture energy by equalizing a speed flow connected to a surface of the plurality of magnets on the at least one axle.

3. The portable power generating system of claim 2, wherein the one or more magnets and the plurality of magnets comprises a rare earth magnet.

4. The portable power generating system of claim 1, wherein each of the at least two direct current power generating motors are configured to:
   draw energy from the battery to generate the direct current power on demand, wherein the battery comprises a direct current battery;
   generate the direct current power in a range of 350 watts to 1000 watts from the rotation of the one or more one magnet; and
   act as a set of bearings to support the at least one axle and reduce friction of the rotation of the one or more magnet.

5. The portable power generating system of claim 4 further comprising a modular frame to support the at least two direct current power generating motors.

6. A power generating system comprising:
   a direct current battery; and
   a modular frame comprising:
     one or more axles, each axle of the one or more axles comprising two opposite ends, wherein at least one axle of the one or more axles is connected to the direct current battery;
     at least one magnet located on a central part of each axle of the one or more axles such that the at least one magnet is spread evenly around a circumference of the axle, wherein energy from the direct current battery drives the at least one axle that in turn rotates the at least one magnet; and at least two direct current power generating motors configured to generate direct current power when the rotation of the at least one magnet turns an armature of the at least two direct current power generating motors;

wherein each of the two opposite ends of each of the one or more axles is connected to at least one of the at least two direct current power generating motors such that the motors connected to opposite ends of one of the axles face one another and rotate in the same direction as the axle but in opposite directions relative to each other due to their facing orientation when the axle is turned;

wherein the direct current battery is configured to turn the at least one axle at a high revolution speed through the at least one direct current power generating motor; and wherein the modular frame is compact and stackable.

7. The power generating system of claim 6, wherein the one or more axles is configured to support a plurality of magnets so as to capture energy by equalizing a speed flow connected to a surface of the plurality of magnets on the one or more axles.

8. The power generating system of claim 7, wherein the at least one magnet and the plurality of magnets comprises a rare earth magnet.

9. The power generating system of claim 8, wherein the at least two direct current power generating motors are configured to:

draw energy from the direct current battery to generate direct current power on demand.

10. The power generating system of claim 6, wherein each of the at least two direct current power generating motors are configured to generate direct current power in a range of 350 watts to 1000 watts from the rotation of the at least one magnet, wherein each of the at least two direct current power generating motors are configured to act as a set of bearings to support the one or more axles and reduce friction of the rotation of the at least one magnet.

11. A power generating system configured to generate power, comprising:

at least one direct current battery;

at least one axle comprising a first end and a second end, wherein the at least one axle is connected to and driven by the at least one direct current battery;

at least one magnet connected to a central part of the at least one axle such that the at least one magnet is spread evenly around a circumference of the at least one axle; and at least two direct current power generating motors comprising a first direct current power generating motor connected to the first end of the at least one axle and a second direct current power generating motor connected to the second end of the at least one axle, wherein the first direct current power generating motor is configured to revolve in a clockwise direction during operation, the second direct current power generating motor is configured to operate in an anti-clockwise motion during the operation, wherein the at least two direct current power generating motors are configured to generate direct current power when the at least one magnet rotates based on a rotation of the at least one axle;

wherein the power generating system is compact and stackable.

12. The power generating system of claim 11, wherein the at least two direct current power generating motors are configured to draw energy from the direct current battery to generate direct current power on demand.

13. The power generating system of claim 12, wherein each of the at least two direct current power generating motors are configured to generate direct current power in a range of 350 watts to 1000 watts from the rotation of the at least one magnet, wherein each of the at least two direct current power generating motors are configured to act as a set of bearings to support the at least one axle and reduce friction of the rotation of the at least one magnet.

14. The power generating system of claim 13, wherein the at least one axle is configured to support a plurality of magnets so as to capture energy by equalizing a speed flow connected to a surface of the plurality of magnets on the at least one axle.

15. The power generating system of claim 14 further comprising a modular frame to support the at least two direct current power generating motors.

* * * * *